United States Patent [19]
Scivier et al.

[11] Patent Number: 6,092,111
[45] Date of Patent: *Jul. 18, 2000

[54] DATA COMMUNICATIONS SYSTEM WITH SESSION CONTROL

[75] Inventors: Mark S. Scivier, Vancouver, Canada; Brian L. Douthitt, Bothell; William Hanell Kilner, Monroe, both of Wash.; Thomas Wayne Lockhart, Richmond, Canada; Geoffrey Richard Scotton, Woodway, Wash.; Robert Wiebe, Richmond, Canada

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/751,470

[22] Filed: Nov. 19, 1996

[51] Int. Cl.[7] .............................. G06F 13/38; G06F 15/17
[52] U.S. Cl. ................................................ 709/227; 714/4
[58] Field of Search ........................ 395/200.57, 200.59, 395/182.02; 455/3.1; 348/6; 709/227, 229, 224, 237, 228; 714/4

[56] References Cited

U.S. PATENT DOCUMENTS 4,975,914 12/1990 Ashton et al. ..................... 395/182.02
5,495,582 2/1996 Chen et al. .......................... 395/200.57
5,530,905 6/1996 Nichols et al. ..................... 395/200.57
5,613,190 3/1997 Hylton ..................................... 455/3.1
5,613,191 3/1997 Hylton et al. ........................... 455/3.1
5,682,325 10/1997 Lightfoot et al. .................. 395/200.59

Primary Examiner—Mark H. Rinehart
Attorney, Agent, or Firm—J. Ray Wood; Charles W. Bethards

[57] ABSTRACT

A method of operation of a data communications system (5) with session control having a data communications network (10) and at least a first communications device (1), a second communications device (2) and a third commnunications device (3) in communications with the data communications network (10). The data communications network (10) identifies a fault status change in communications with the first communications device (1), generates a session control command (6) with an identification number (7) attached responsive to identifying the fault status change and sending the session control command (6) to at least the second and the third communications devices (2 and 3). At least at the second communications device (2), the second communications device (2) receives the session control command (6), deter-mines from the identification number (7) whether the second communications device (2) is affected by the fault status change and selectively performs a session control action in response thereto.

32 Claims, 8 Drawing Sheets

DATA COMMUNICATIONS SYSTEM WITH SESSION CONTROL

FIELD OF THE INVENTION

This invention relates to a data communications system having session control between a group of user terminals communicating over shared channels with one or more host computers.

BACKGROUND OF THE INVENTION

Data communications systems provide fixed or wireless two-way data communications enabling users, such as mobile professionals, to communicate almost instantly with business associates, customers, family members, and friends. A typical wireless data communications system comprises user terminals, network gateways, network controllers and base stations. A typical base station covers a small zone of several kilometers in radius and forms a data communications system with user terminals. A network controller typically controls communications of an area which covers a plurality of base stations. A host computer is generally installed by the user and executes various applications.

Data communications systems are used for wireless e-mail and messaging, news retrieval, and other information services. Additional applications can be developed that allow users wireless access to corporate and public information systems.

Today, information can be accessed exactly when and where it is needed, and time sensitive messages can be sent and received wherever the user goes. However, when a host computer is down, the data communications network is unable to deliver messages from the user terminals to the problem host computer. As a result, data communications network performance can be adversely affected. If the affected applications continue to send data from the user terminals to the problem host computer, then all users (including those not associated with the problem host computer) may observe longer message transit times.

Network performance can also be adversely affected by host computers that are slow to respond to messages sent from user terminals. As with host computers that are down, all users may observe degraded performance even if they belong to a different group of user terminals.

Further, congestion can occur when messages deplete a critical resource such as buffer space. Buffer space is an area of memory allocated for buffering purposes. In data communications networks, host computers that are down and host computer that are slow can lead to holding messages at the interfaces between network components.

As a result, there is a need for an improved method for managing sessions and performing end-to-end session control in a data communications system. It would be desirable to protect the data communications network in situations where faults connected to a particular host computer do not affect all user terminals and their users.

| Glossary of Acronyms | |
|---|---|
| DTE | Data Terminal Equipment |
| HUM | Host User Mapping |
| NAK-SDU | Negative acknowledgment - Service Data Unit |
| RD-LAP | Radio Data-Link Access Protocol |

-continued

| Glossary of Acronyms | |
|---|---|
| RNC | Radio Network Controller |
| RNG | Radio Network Gateway |
| RPM | Radio Packet Modem |
| SDU | Service Data Unit |

SUMMARY OF THE INVENTION

This invention has many embodiments and advantages, including but not limited to the following aspects. A data communications system is provided comprising a data communications network, at least a first host computer and a group of at least two user terminals. At least the first host computer is connected to the data communications network. The group of at least two user terminals (e.g., radio data terminals) are in communication with at least the first host computer via the data communications network.

The data communications network comprises a RNG, a buffer, a fault detector, a command generator, a database, a RNC and at least one base station. The buffer temporarily stores messages sent from the user terminal to the host computer and vice versa. The fault detector is associated with the data communications network for identifying a fault in communication with at least the first host computer. The command generator is responsive to the fault detector for generating a session control command and sending the session control command to the group of at least two user terminals. The database identifies relationships between the group of at least two user terminals and at least the first host computer. This relationship is desirable for selecting a group of user terminals in communication with at least the first host computer. At least the first host computer is coupled to the command generator for causing the command generator to generate session control commands specifically to a group of user terminals that are affected by at least the first host computer.

In a preferred embodiment of the invention, the database comprises hostuser mappings which identify communication sessions between the group of user terminals and at least the first host computer. The host-user mappings enable the command generator to send the session control command to each user terminal to identify the communication session. Each user terminal has means for receiving the session control command, for comparing the received session identifier with a session identifier stored at the user terminal and for taking session control action if there is a match. However, instead of storing the host-user mapping table in the database, other arrangements can be used for causing the command generator to send a session control command to the group of user terminals (discussed in detail below).

In an alternate embodiment, the RNC, or other network device, intercepts subsequent messages (following a session control action) sent from a user terminal to a host computer. Preferred embodiments of the invention are described, by way of examples, with reference to the drawings.

BRIEF DESCRIPTION OF THE DRAWINGS

Other advantages and features of the invention are described with reference to preferred embodiments which are intended to illustrate and not limit the invention and in which.

DETAILED DESCRIPTION OF THE DRAWINGS

Figure 1:
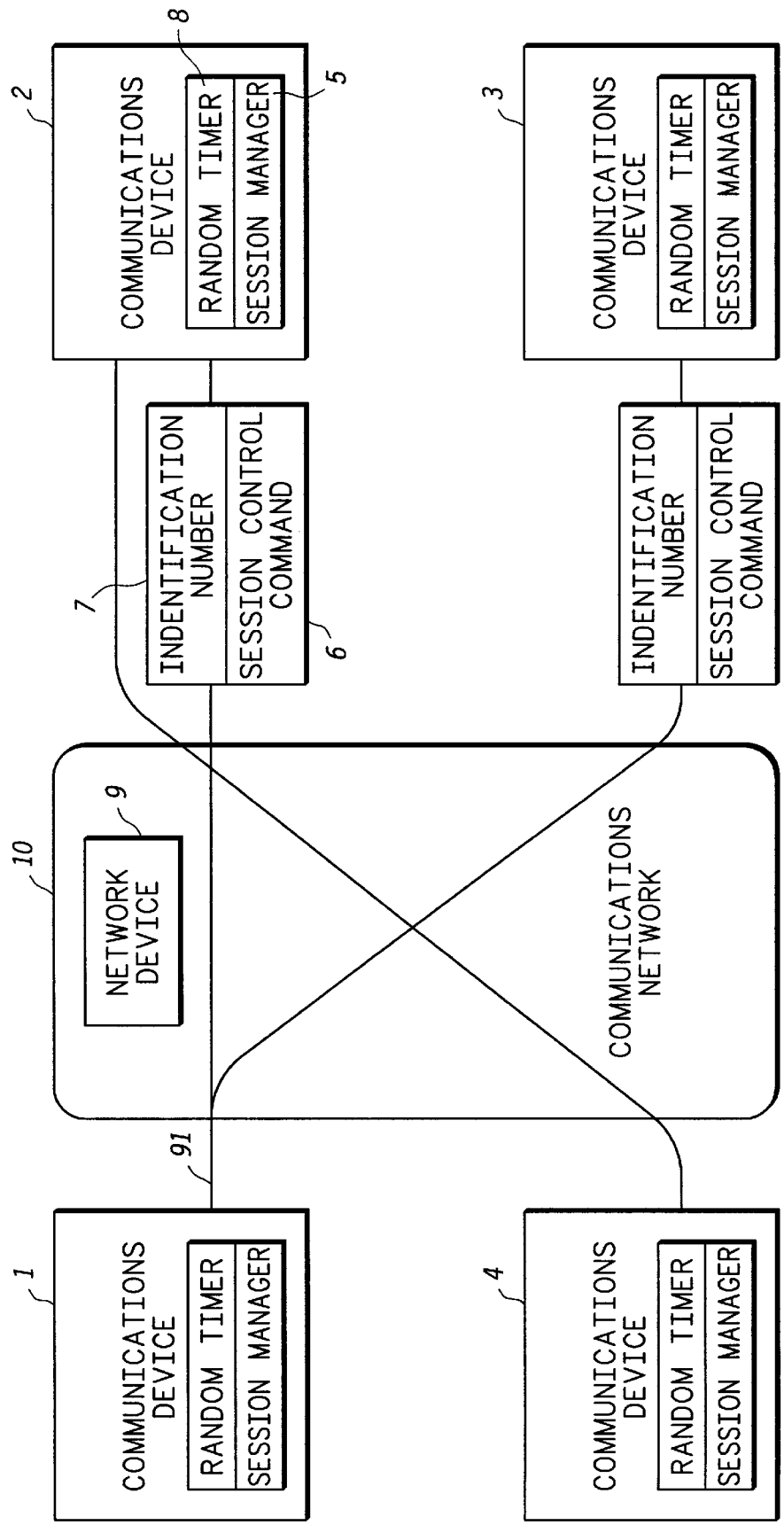
FIG. 1 is a generalized embodiment of the invention depicting a method of operation of a data communications system.

FIG. 1 is a generalized embodiment of the invention depicting a method of operation of a data communications system 5. The data communications system 5 comprises a data communications network 10 and at least a first communications device 1, a second communications device 2 and a third communications device 3 in communication with the data communications network 10. Each communications device comprises a session manager 5.

In operation, the data communications network 10 identifies at, for example, path (91) a fault status change in communication with the first communications device. A network device 9 of the data communications network 10 generates a session control command 6 responsive to identifying the fault status change. The session control command 6 generated includes an identification number 7. The identification number can either be, but is not limited to any of the following: a user identification number, a session identification number, a link identification number, a host path communication identification number, a port identification number, a terminal identification number, a host-user mapping identification number or a modem identification number. The network device 9 of the data communications network 10 sends the session control command to at least the second and the third communications devices 2 and 3 either by individually addressing the message to each of the affected communications devices, or preferably, by addressing a single broadcast message to a plurality of the communications devices. Alternatively, other group communication mechanisms can be used. Each of at least the second and the third communications devices 2 and 3, respectively, receives the session control command 6, determines from the identification number 7 whether the respective communications device is affected by the fault status change and selectively performs a session control action in response thereto. The session control action may be, but is not limited to, ceasing transmission to at least an identified destination for at least a period of time, canceling an earlier session control action, or resetting session control actions.

Figure 2:
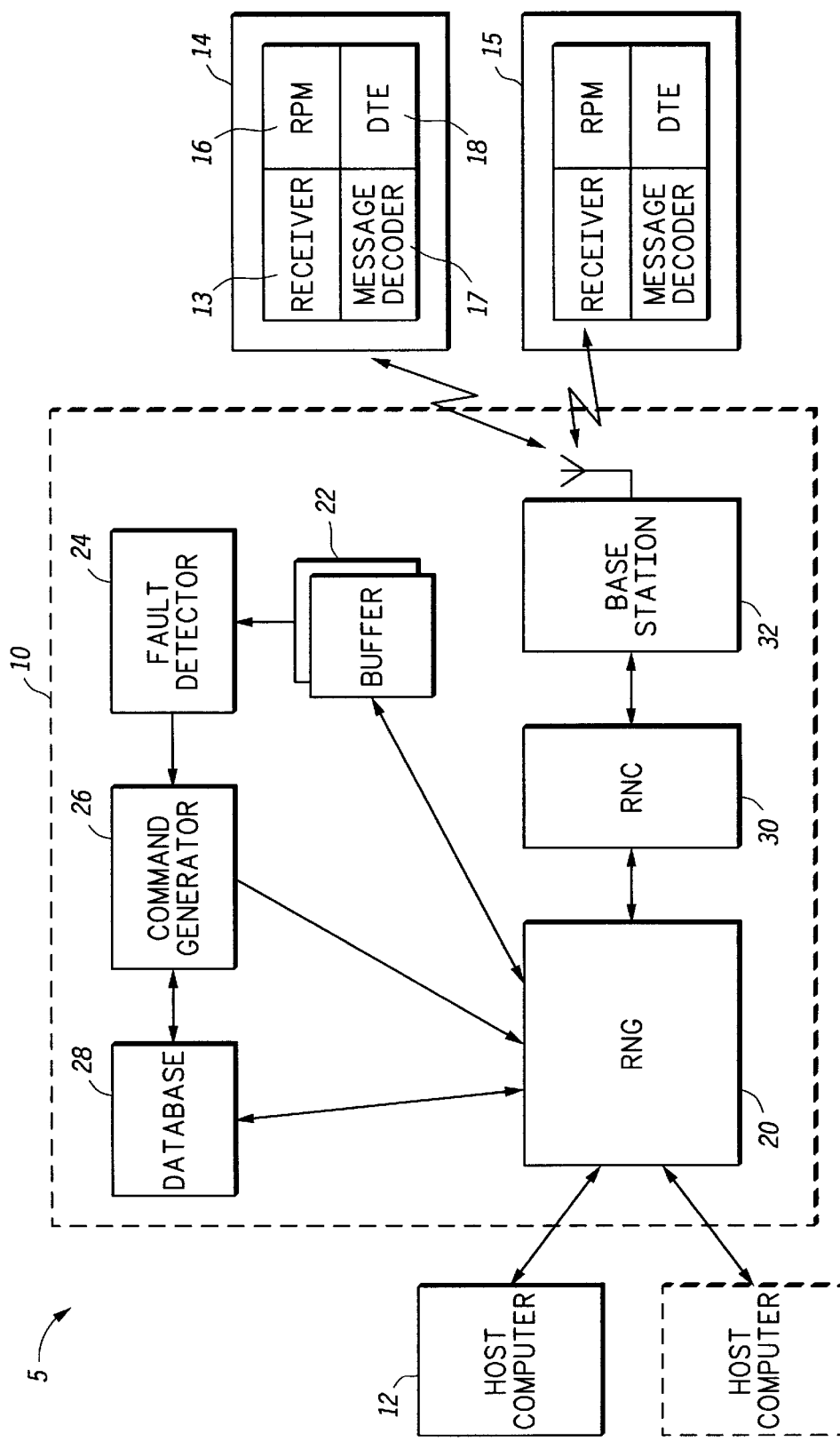
FIG. 2 is a block diagram illustrating the data communications system in accordance with a preferred embodiment of the invention.

Referring to FIG. 2, the data communications system 5 is shown in accordance with a preferred embodiment of the invention. The data communications system 5 comprises the data communications network 10, at least the first host computer 12, and the group of at least two user terminals 14 and 15. The data communications network 10 comprises the RNG 20, the RNC 30, and at least one base station 32 (but typically many base stations). An example of a suitable base station is a data system station-II (DSS-II) base station available from MOTOROLA, Inc. The RNG 20 further comprises the following components: a buffer 22, a fault detector 24, a command generator 26, and a database 28. Each user terminal 14 comprises a receiver 13, a RPM 16, or other suitable modem, a message decoder 17 and a DTE 18 (e.g., laptop computer, palmtop computer, two-way pager, or cellular telephone). The receiver receives a message sent to a plurality of user terminals. The message decoder decodes the message and identifies a session control command which includes an identification number relevant to the user terminal. Each user terminal 14 may also include a session manager within the DTh. The session manager performs a session control action in response to a session control command (discussed below).

In operation, a user terminal 14 sends a message to a host computer 12. The message sent from the user terminal 14 is transmitted from the user terminal 14 to the base station 32. The base station 32 delivers the message sent by the user terminal 14 to the RNG 20. At this time, a session identifier and a host identifier, or other suitable indication identifying which user terminal is in communication with which host computer, are recorded in the database 28. Further, the message sent by the user terminal 14 is temporarily stored in the buffer 22. Thereafter, the message is passed to the host computer 12.

If the host computer 12 is down or if the host computer 12 is slow at the time a message is transmitted from the user terminal 14 to the host computer 12, the message sent by the user terminal 14 remains in the buffer 22. As a result, all subsequent messages sent from the user terminal 14 will accumulate in the buffer 22. When the buffer 22 becomes full, the fault detector 24 is triggered indicating that there is a problem communicating with the host computer 12. In response to the fault detector 24, the command generator 26 generates a session-off command and sends the session-off command through the RNG 20 to the group of user terminals. When the session-off command reaches the user terminals, the user terminals stop sending subsequent messages to the host computer 12 until a session-on command is received by the user terminals indicating that the host computer 12 has recovered or that space is now available in the buffer 22.

An alternative operation of FIG. 2 occurs when the host computer 12 sends a message to a user terminal 14. The host computer 12 transmits the message to the data communications network 10. Within the data communications network 10, the message is received by the RNG 20. At this time, the session identifier 40 and the host identifier 42, or other suitable host-user communication identifiers, are recorded in the database 28. The message sent by the host computer 12 is temporarily buffered in the buffer 22, however, the use of the buffer 22 is less significant when the message is sent from the host computer 12 to the user terminal 14. The message sent from the host computer 12 is then delivered from the RNG 20 to the base station 32 where it is then transmitted to the user terminal 14.

Various ways can be devised for identifying the group of user terminals in communication with a particular host computer at any given time. For example, the host computer 12 is given a unique identifier (e.g., internet protocol address). The host identifier is identified by the group of user terminals, and the group of user terminals independently determine whether they are communicating with the host computer identified by the host identifier. Each user terminal, if affected, takes session control action in response thereto.

Alternatively, a data communications system 5 is provided where the database 28 includes an identification number identifying user terminals that are affected by a host computer going down or a buffer 22 in the RNG 20 reaching a pre-defined threshold. In response to identifying the affected user terminals, the command generator 26 sends a session control command to the at least two user terminals which includes the identification number of the affected user terminals. Each user terminal has means for receiving the session control command, for comparing the identification number included with the session control command with a predetermined identification number stored at the user terminal, and for taking session control action if there is a match.

In the preferred embodiment, however, a HUM table 39 is stored in the database 28. The HUM table 39 represents the routing table which defines the mapping between the session identifier 40 for a user terminal 14 and the host identifier 42. In effect, the HUM table 39 represents the user terminals 14 that share the same routing table.

Figure 3:
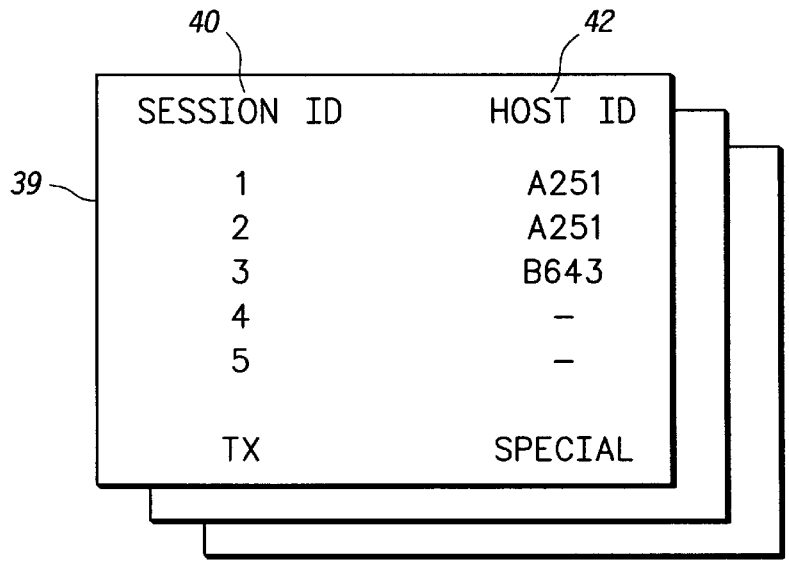
FIG. 3 is an example of a host-user mapping maintained at the RNG of FIG. 2.

FIG. 3 is an example of a HUM table 39 maintained in the database at the RNG 20 of FIG. 2. A HUM table 39 is assigned in an operator interface system to each user terminal or group of user terminals 14. When a buffer 22 in the RNG 20 reaches a pre-defined threshold or a host computer 12 is down, the RNG 20 issues a session control (session-off) command to the RNC 30. The session-off command contains each HUM and session identifier 40 combination that maps to the problem host identifier 42.

In the preferred embodiment, the database of the session status for each session identifier 40 for each HUM table 39 is maintained within the user terminal 14 itself. Alternatively, a RNC 30 (e.g., a RNC 6000 series controller available from MOTOROLA, Inc.) maintains a database of the session status for each session identifier 40 for each HUM table 39. The RNC 30 intercepts subsequent messages transmitted from the user terminals 14 identified by that session. At this time, the RNC 30 may issue an error response to the user terminal 14.

Figure 4:
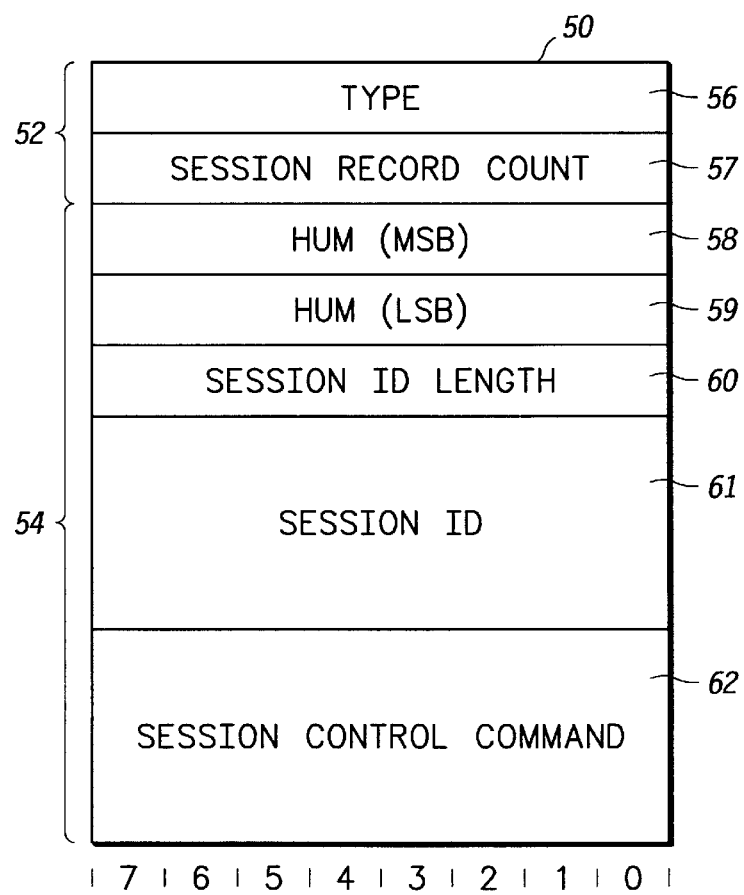
FIG. 4 is an illustration of the format of a SDU for session management data.

FIG. 4 is an illustration of the format of a SDU for session management data 50. The SDU 50 comprises a first part 52 and a second part 54. The first part 52 comprises a type 56 and a session record count 57. The second part 54 comprises the HUM 58, a session identifier length 60, a session identifier 61, and a session control command 62. The second part 54 may be repeated many times.

The session management data 50 contains one or more session records, each of which comprises a HUM 58 and 59, session identifier 61, and session management command 62. The session identifier 61 comprises the initial bytes of the data header of the protocol data unit (PDU).

The contents of each subpart of the session management data 50 are as follows: the type 56 (8 bits) indicates the type of session management data 50 (00=host computer-to-user terminal session control, 01=user terminal-to-host computer session control); the session record count 57 (8 bits) is the number of session management records consisting of HUM, session identifier and command; the HUM 58 and 59 (16 bits) is a two octet field defining the user terminals 14 to which the record applies; the session identifier length 60 (8 bits) is the number of octets in the session identifier (0 to 63); the session identifier 61 (0 to 63 octets) is the variable length field specifying the session identifier for this session record; and the session control command 62 (variable length) can take several forms, for example it can be a session-on command, session-off command, or session-off "for a while" command.

Preferably, a session-on command and a session-off command have an interval lower bound and an interval higher bound which define an interval during which the group of user terminals randomly select a time to resume data communications. A random timer 8 is maintained in the session manager of each user terminal for causing a session control action to operate for a random period of time. For example, once a fault in communication with the first host computer has been identified, a session control (session-off) command is issued to the user terminals. Once the fault has been resolved, a second session control (session-on) command is issued to the user terminals indicating that the fault in communication with the first host computer has been resolved. Thereafter, the user terminals resume data communications with the first host computer in a randomized time. The advantage of defining an interval during which the group of user terminals randomly select a time to resume data communications is to avoid a situation where a large number of user terminals all recommence transmitting messages to the host computer simultaneously.

A single SDU can identify a number of unique HUM and session identifier combinations. Further, a single SDU can be sent to many user terminals to deliver a session control command 62 to each of the user terminals.

Figure 5:
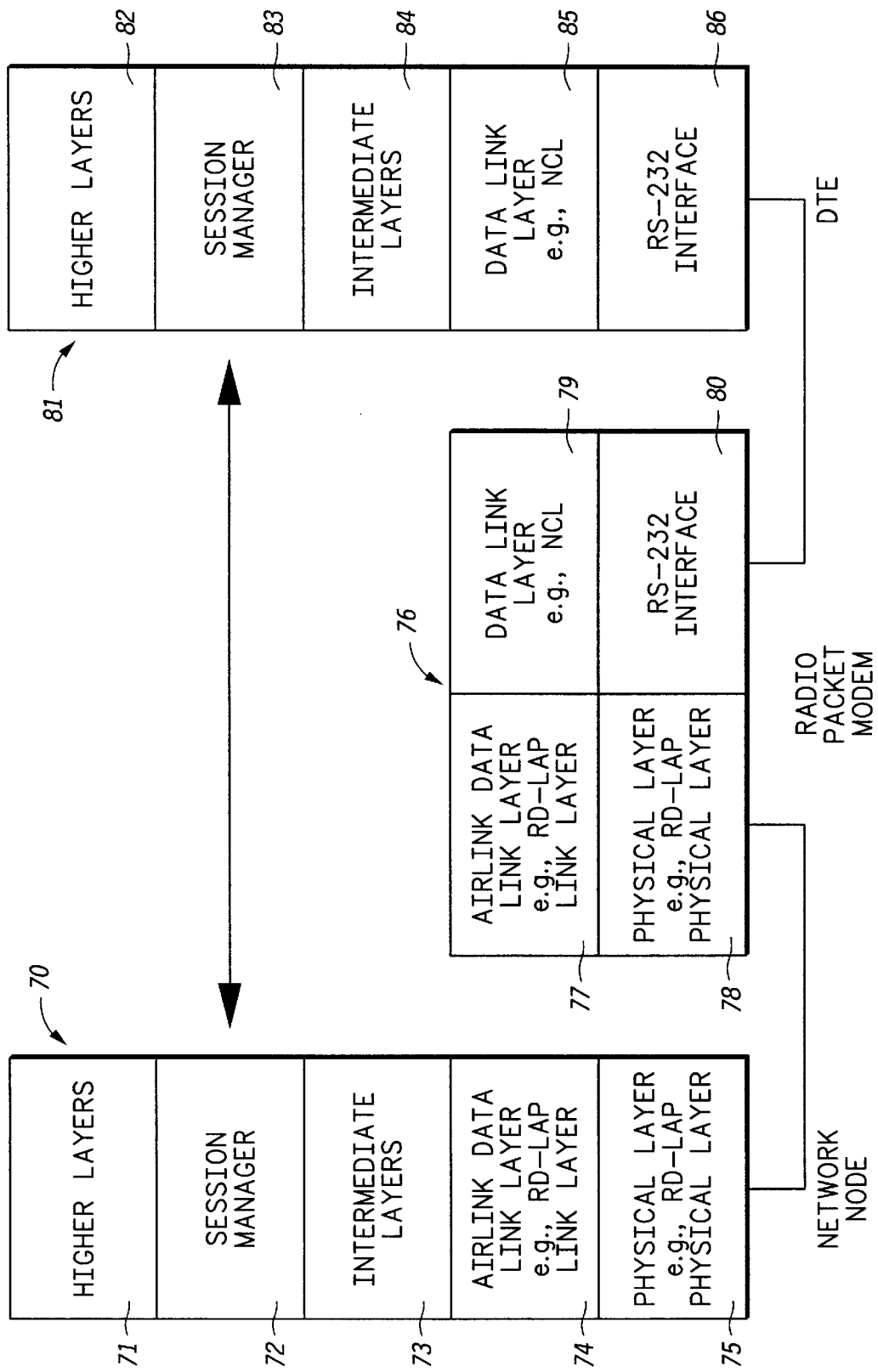
FIG. 5 is an illustration of a protocol stack for the system of FIG. 2, provided in particular for illustration of a novel session manager.

FIG. 5 is an illustration of a protocol stack for the system of FIG. 2, provided in particular for illustration of a novel session manager. FIG. 5 is divided into three sections with each section having a corresponding protocol stack. The first section 70 is a network node. The network node contains higher layers 71, a session manager 72, intermediate layers 73, an airlink data link layer 74 (e.g., RD-LAP link layer), and a physical layer 75 (e.g., RD-LAP physical layer). The second section 76 is a radio packet modem. The radio packet modem contains an airlink data link layer 77 (e.g., RD-LAP link layer), a physical layer 78 (e.g., RD-LAP physical layer), a data link layer 79 (e.g., NCL), and a RS-232 interface 80. The third section 81 is the DTE. The DTE contains higher layers 82, a session manager 83, intermediate layers 84, a data link layer 85 (e.g., NCL), and a RS-232 interface 86.

Figure 6:
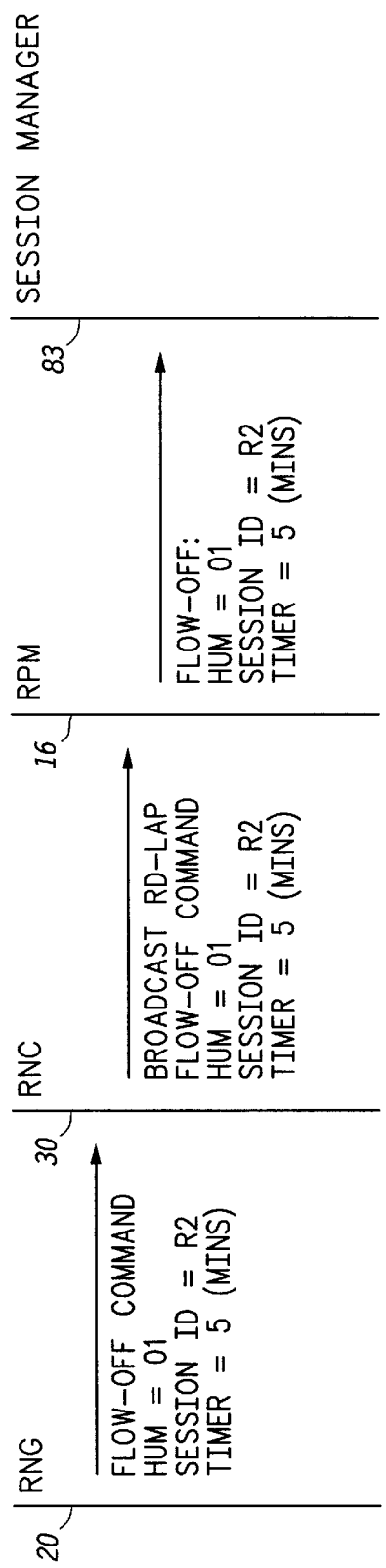
FIG. 6 is an illustration of signaling between various elements of the data communications system of FIG. 2 according to the preferred embodiment of the invention.

FIG. 6 is an illustration of signaling between various elements of the system of FIG. 2 according to a preferred embodiment of the invention. The following specifications were taken either at the time the host computer 12 went down or at the time the buffer 22 became full: HUM=01; session identifier=R2; Timer=5 (mins). Thereafter, the RNG 20 transmits the session-off command to the RNC 30 using the aforementioned specifications. The RNC 30, in turn, initiates the broadcast of the session-off command received by the RNG to the base station 32. The base station 32 broadcasts the session-off command over the RD-LAP to the RPM 16. The RPM 16 then transmits the session-off command to the session manager 83. The session manager 83 can be implemented in either the RPM 16 or the DTE 18.

Figure 7:
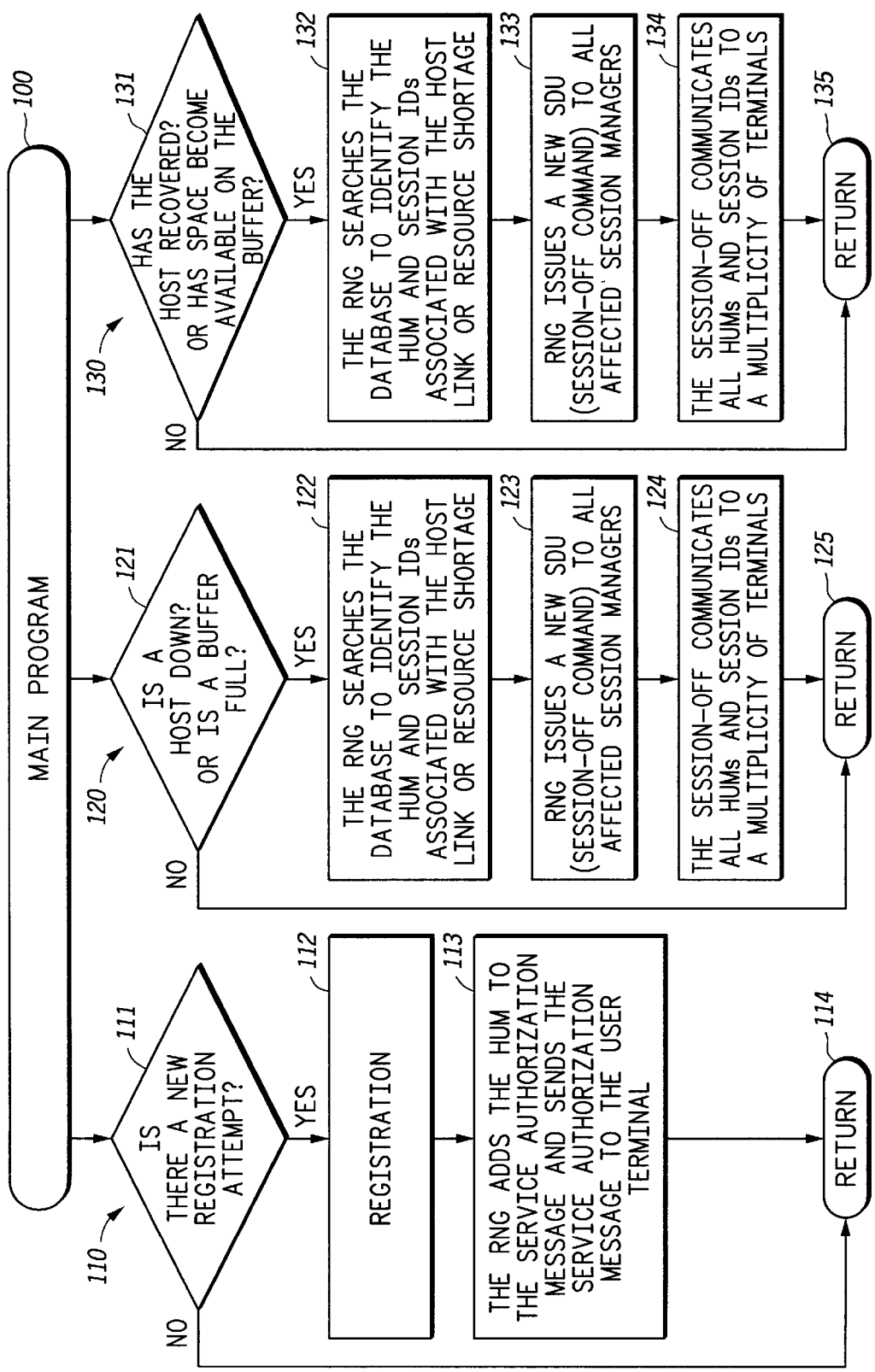
FIG. 7 is a detailed flow diagram of implementation of user terminal-to-host computer session control according to the preferred embodiment of the invention.

FIG. 7 is a detailed flow diagram of implementation of user terminal-to-host computer session control according to the preferred embodiment of the invention. Referring to FIG. 7, three sub-routines, 110, 120, and 130, simultaneously occur within the main program 100. In the first sub-routine, step 111 determines whether there is a registration attempt. If no, step 114 loops the first sub-routine 110 back to step 111 and waits to receive a new message to repeat the first sub-routine 110. If yes, then a registration process occurs in step 112. Step 113 initiates the RNG 20 to add the HUM to the service authorization message and sends the service authorization message to the user terminal. The session manager of the user terminal, being authorized, saves its HUM. Once completed, step 114 loops the first-sub-routine 110 back to step 111 and waits to receive a new message to repeat the first sub-routine 110.

In the second sub-routine 120, step 121 determines whether a host computer is down or whether a buffer in the RNG 20 is full. The buffer 22 becomes full if either the host computer 12 is down and subsequent messages are sent to the host computer 12 from the user terminals or if the host computer 12 is slow in receiving or transmitting messages. Consequently, if either the host computer 12 goes down or the buffer 22 becomes full, the RNG 20 searches the database to identify the HUM and session IDs associated with the host link or resource shortage in step 122. Once the HUM and session IDs are identified, the RNG 20 issues a SDU (session-off command) to all affected session managers in step 123. The session-off command communicates the HUM and the session ID to a group of user terminals 14 adversely affected by either the host computer 12 being down or the buffer 22 becoming full. As a result of receiving the session-off command, the user terminals 14 stop or slow down sending messages to the host computer 12 (i.e., until a session-on command is issued).

The third sub-routine 130 operation is dependent on the outcome of the second sub-routine 120. If a host computer 12 is down or a buffer 22 is full, step 131 determines when the host computer 12 recovers or when space on the buffer 22 is available. If neither has occurred, step 135 continuously loops the third-sub-routine 130 to step 131 until an affirmative response is received in step 131.

If the host computer 12 has recovered or space has become available on the buffer 22, the RNG 20 searches the database to identify the HUM and session IDs associated with the host link or resource shortage in step 132. The RNG 20 then issues a new SDU (session-on command) to all affected session managers in step 133. The session-on command communicates the HUM and the session IDS to the group of user terminals that were adversely affected by either the host computer 12 being down or the buffer 22 becoming full. Once the session-on command is received by the user terminals 14, they may proceed to send messages to that particular host computer 12 after the random time period referred to above.

Figure 8:
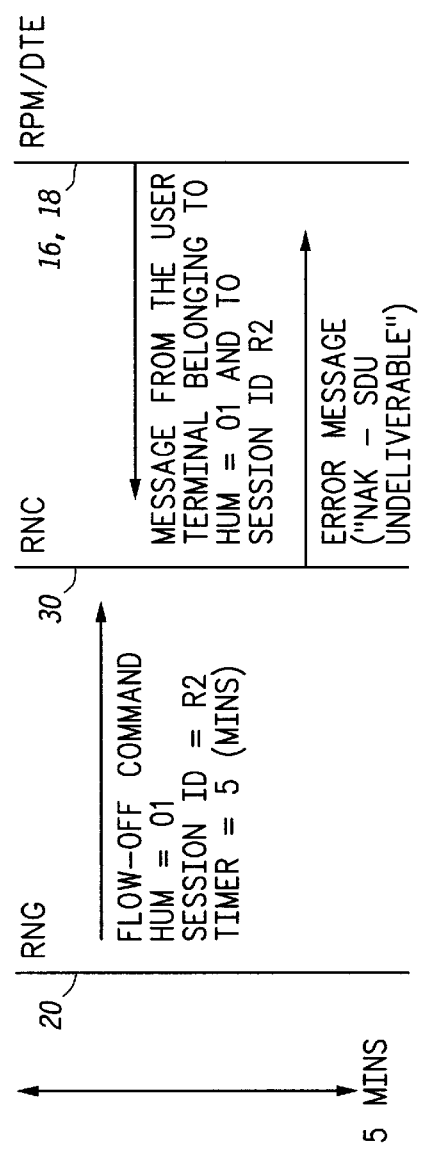
FIG. 8 is an illustration of signaling between various elements of the system of FIG. 2 according to an alternative embodiment of the invention.

FIG. 8 is an illustration of signaling between various elements of the system of FIG. 2 according to an alternative embodiment of the invention. This alternative embodiment is particularly useful where one or more DTEs 18 are not able to session-off in response to a session-off command. The following specifications were taken either at the time the host computer 12 was down or at the time the buffer 22 was full: HUM=01; session identifier=R2; Timer=5 (mins). Thereafter, the RNG 20 issues a session-off command to the RNC 30. Anytime thereafter, the RPM 16/DTE 18 transmits a message from the user terminal to the host computer belonging to HUM 01 and to session identifier R2. As a result of the session-off command previously issued by the RNG 20, the RNC 30 responds to the message sent by the user terminal to the host computer by issuing an error message ("NAK-SDU Undeliverable") to the user terminals.

Figure 9:
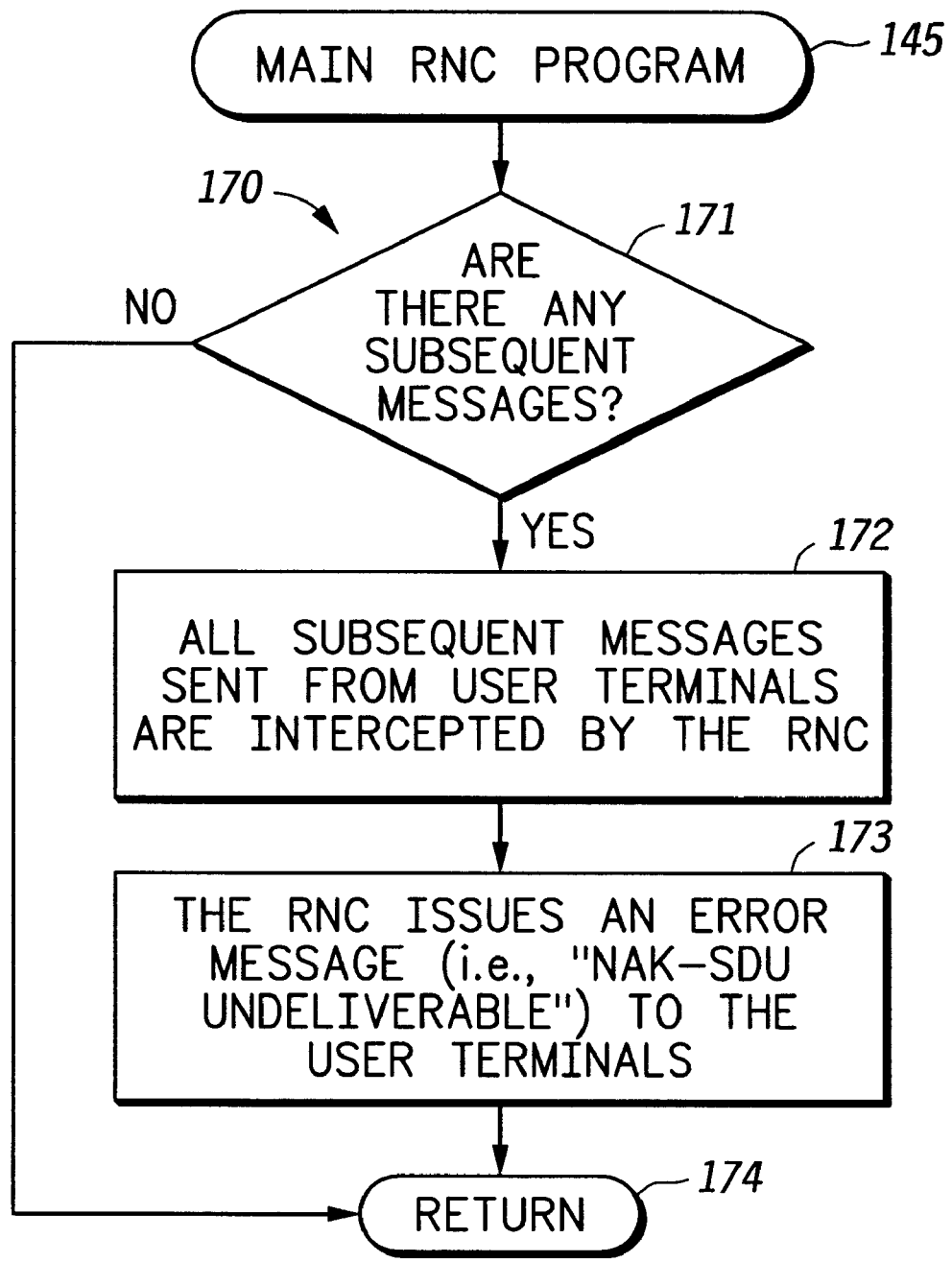
FIG. 9 is a detailed flow diagram of implementation of user terminal-to-host computer session control according to the alternative embodiment of the invention.

FIG. 9 is a detailed flow diagram of implementation of user terminal-to-host computer session control according to the alternative embodiment of the invention. Referring to FIG. 9, sub-routine 170 occurs within the main RNC program 145. In this embodiment, the RNC 30 maintains a session manager (not shown) for each user terminal. The RNC 30 records the session-on and session-off state for each user terminal.

The issuance of a session-off command by the RNG 20 to the RNC 30 affects the session management state associated with that user terminal 14. The receipt of a message from the user terminal 14 triggers the operation of sub-routine 170 in the main RNC program 145. If the RPM 16/DTE 18 issues subsequent messages from user terminals belonging to the affected HUM and session identifier prior to the RNG 20 issuing a session-on command, the RNC 30 intercepts the message in step 172. In step 173, the RNC 30 protects the data communications network 10 by both stopping the subsequent message sent by the user terminal from reaching the RNG 20 and issuing an error message ("NAK-SDU Undeliverable") to the RPM 16/DTE 18. Step 174 loops sub-routine 170 back to step 171, thus allowing the RNC 30 to continuously issue error messages to the RPM 16/DTE 18 for all subsequent messages sent by user terminals belonging to the affected HUM and session identifier until the RNG 20 issues a new SDU (session-on command) to the RNC 30 or the session-off times out. Eventually, the host computer 12 will recover or there will be space made available on the buffer and the operation will proceed as before.

Figure 10:
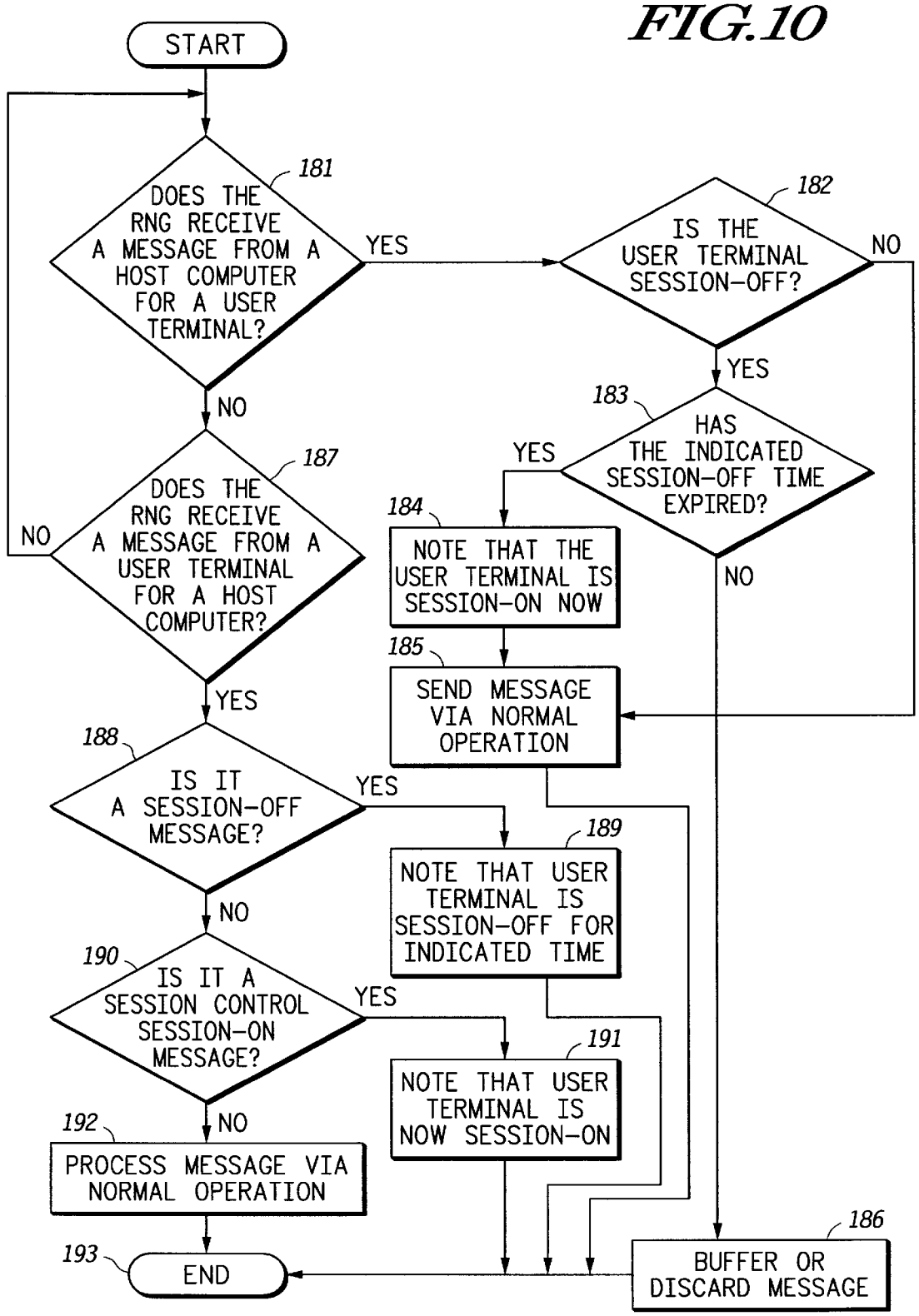
FIG. 10 is a flow diagram of session control in accordance with a further aspect of the invention.

FIG. 10 is a flow diagram of session control in accordance with a further aspect of the invention. The initial query is whether the RNG 20 received a message from a host computer 12 for a user terminal 14. If yes, then step 182 asks whether the user terminal 14 is session-off as previously noted. If yes, step 183 determines whether the indicated session-off time has expired. If yes, then the user terminal 14 is session-on at step 184 and the message is sent via normal operation at step 185.

Referring back to step 182, if the user terminal is session-off as previously noted, but the indicated session-off time has not expired in step 183, then the message is either buffered or discarded at step 186. Again, referring back to step 182, if the user terminal 14 is not session-off as previously noted, then the message is sent via normal operation at step 185.

Now referring back to step 181, if the RNG 20 did not receive a message from a host computer 12 for a user terminal 14, and the RNG 20 receives a message from a user terminal 14 for a host computer 12 at step 187, step 188 determines whether the message is a session-off message. If yes, then the user terminal is session-off for an indicated time at step 189. If no, then step 190 determines whether the message is a session-on message. If yes, then the user terminal 14 is session-on at step 191. If the answer to step 190 is no, then the message is processed via normal operation at step 192.

While the invention has been described in conjunction with a specific embodiment thereof, it is evident that many alterations, modifications, and variations will be apparent to those skilled in the art in light of the foregoing description. Thus, it should be understood that the invention is not limited by the foregoing description, but embraces all such alterations, modifications, and variations in accordance with the spirit and scope of the appended claims.

We claim:

1. A method of operation of a data conmnunications system with session control having a data communications network and at least a first communications device, a second communications device and a third communications device in communications with the data communications network, the method comprising in the data communications network the steps of:

identifying a fault status change in communications with the first communications device;

generating a session control command responsive to the step of identifying the fault status change, the session control command including an identification number; and sending the session control command to at least the second communications device and the third communications device.

2. The method of claim 1, further comprising, at least at the second communications device:

receiving the session control command;

determining from the identification number whether the second communications device is affected by the fault status change; and selectively performing a session control action in response thereto.

3. The method of claim 2, wherein the session control action comprises one of: ceasing transmission to at least an identified destination for at least a period of time, canceling an earlier session control action, and resetting session control actions.

4. The method of claim 1, wherein the identification number is one of: a terminal identification number, a user identification number, a session identification number, a link identification number, a host communication path identification number, a port identification number and a modem identification number.

5. A user terminal comprising:

a receiver that receives a message including a session control command indicative of a change in fault status sent to a plurality of user terminals;

a message decoder coupled to the receiver that decodes the message and identifies the session control command including an identification number relevant to the user terminal; and a session manager coupled to the message decoder operative to perform a session control action in response to the session control command.

6. The user terminal of claim 5, wherein the message decoder identifies a host computer to which a message is sent and associates the identification number with the host computer.

7. The user terminal of claim 5, wherein the message decoder identifies an identification number which is one of: a terminal identification number, a user identification number, a session identification number, a link identification number a modem identification number, and a host-user mapping identification number.

8. The user terminal of claim 5, wherein the message decoder identifies an identification number which is a host-user mapping identification number.

9. The user terminal of claim 5, wherein the session manager comprises a random timer for causing a session control action to operate for a random period of time.

10. A data communications system comprising a network device and a plurality of terminals, the network device comprising a fault detector and a command generator responsive to the fault detector to generate a session control command having an identification number and to send the session control command to a plurality of terminals, wherein at least one terminal comprises:

a receiver that receives a message sent to said plurality of user terminals;

a message decoder coupled to the receiver that decodes the message and identifies the identification number in the session control command as being relevant to the at least one terminal; and a session manager coupled to the message decoder operative to perform a session control action in response to the session control command.

11. The data communications system of claim 10 comprising a network controller having a session manager corresponding to each terminal of the plurality of terminals.

12. A data communications system comprising:

a data communications network;

at least a first host computer connected to the data communications network;

a group of at least two user terminals in communications with the data communications network;

a fault detector associated with the data communications network for identifying a fault in communications with at least the first host computer; and a command generator which is responsive to the fault detector for generating a session control command and sending the session control command to the group of at least two user terminals.

13. The data communications system according to claim 12, wherein the data communications network comprises:

a plurality of host computers; and a database identifying relationships between user terminals and host computers, wherein the database is coupled to the command generator for causing the command generator to generate session control commands specific to user terminals affected by at least the first host computer.

14. The data communications system according to claim 13, further comprising the command generator to extract from the database an identification number of at least one user terminal.

15. The data communications system according to claim 13, wherein the session control command includes an identification number of a host communication path identification number.

16. The data communications system according to claim 13, wherein the database comprises host-user mappings identifying communications sessions between user terminals and at least the first host computer, for causing the command generator to send the session control command to each of the at least two user terminals identifying the communications sessions.

17. The data communications system according to claim 13, wherein the database includes identification numbers identifying user terminals associated with at least the first host computer for causing the command generator to send a session control command to the at least two user terminals identified by the identification numbers.

18. The data communications system according to claim 17, wherein each user terminal has means for receiving the session control command, for comparing the identification numbers included in the session control command with a predetermined identification number for a user terminal and for taking session control action if there is a match.

19. The data communications system according to claim 12, further comprising a network gateway connecting the data communications network to at least the first host computer, wherein the fault detector is coupled to the network gateway for detecting faults in communications with at least the first host computer.

20. The data communications system according to claim 19 further comprising a buffer wherein the buffer is coupled to the network gateway for buffering messages sent by a user terminal to a host computer and vice versa.

21. The data communications system according to claim 12 wherein the at least two user terminals are radio data terminals.

22. The data communications system according to claim 21, further comprising a radio base station for communicating between the data communications network and the at least two user terminals.

23. A method of operation of a data communications system having a data communications network, at least a first host computer connected to the data communications network and a group of at least two user terminals in communications with the data communications network, the method comprising in the data communications network the steps of:

identifying a fault in communications with at least the first host computer;

generating a session control command responsive to the step of identifying the fault; and sending the session control command to the group of at least two user terminals.

24. The method of claim 23, further comprising the steps of:

identifying that the fault in communication with at least the first host computer has been resolved;

sending a second session control command to the group of at least two user terminals indicating that the fault in communication with at least the first host computer has been resolved; and resuming data communications with at least the first host computer in a randomized time.

25. The method of claim 23, further comprising the steps of:

identifying relationships between the group of at least two user terminals and at least a first host computer;

selecting user terminals in communications with at least the first host computer; and generating session control commands specific to user terminals affected by at least the first host computer.

26. The method of claim 25, further comprising the steps of:

commencing at least one session between each of the at least two user terminals and the data communications network;

maintaining host-user mappings identifying, for a given host computer, a session between user terminals and the given host computer, wherein the step of sending the session control command comprises sending the session control command to the at least two user terminals and including information in the session control command identifying a session affected by at least the first host computer;

at each of the at least two user terminals:

determining from the session, whether a user terminal is affected by at least the first host computer; and taking session control action for the session affected when a user terminal is affected by at least the first host computer.

27. The method of claim 25, further comprising the steps of:

commencing at least one session between a user terminal and the data communications network;

receiving the session control command;

identifying from the session control command that at least one session is affected by at least the first host computer; and taking session control action for the at least one session that is affected.

28. The method of claim 25, further comprising the steps of:

commencing at least two sessions between a user terminal and the data communications network;

receiving the session control command;

identifying from the session control command that at least one session is affected by at least the first host computer; and taking session control action for the at least one session that is affected.

29. The method of claim 25, wherein the step of sending the session control command includes information identifying a user terminal affected by at least the first host computer; and at each of the at least two user terminals, determining from an identification of the user terminal included in the session control command, whether the user terminal is affected by at least the first host computer.

30. The method of claim 23, further comprising the steps of:

buffering messages sent by a user terminal to a host computer and vice versa; and indicating to a fault detector a problem in communicating with a host computer.

31. The method of claim 23, further comprising the steps of:

intercepting and storing the session control command in a network controller, recording a host-user mapping and a session identifier in the network controller; and intercepting subsequent messages from a user terminal to a host computer identified by that session by the network controller.

32. The method of claim 31, wherein the step of intercepting subsequent messages from the user terminal to the host computer by the network controller includes the network controller issuing an error response to the user terminal.

* * * * *